(12) United States Patent
Satoh

(10) Patent No.: US 6,677,018 B1
(45) Date of Patent: Jan. 13, 2004

(54) HIGH PRESSURE RUBBER HOSE AND MANUFACTURING METHOD THEREOF

(75) Inventor: Takashi Satoh, Hiratuska (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 09/719,173

(22) PCT Filed: Apr. 14, 2000

(86) PCT No.: PCT/JP00/02440
§ 371 (c)(1),
(2), (4) Date: Dec. 14, 2000

(87) PCT Pub. No.: WO00/63601
PCT Pub. Date: Oct. 26, 2000

(30) Foreign Application Priority Data

Apr. 16, 1999 (JP) ............................................. 11-109956

(51) Int. Cl.[7] ............................... B32B 1/00; B32B 1/08
(52) U.S. Cl. .................. 428/36.9; 428/36.91; 428/35.7; 138/125; 156/171; 156/172; 156/173; 156/174
(58) Field of Search ............................. 428/36.91, 35.7, 428/36.9; 156/171–4

(56) References Cited

U.S. PATENT DOCUMENTS

| | | | | | |
|---|---|---|---|---|---|
| 4,157,101 A | * | 6/1979 | Ross | ........................ | 138/130 |
| 4,431,031 A | * | 2/1984 | Ettlinger | ..................... | 138/109 |
| 4,451,070 A | * | 5/1984 | Sauer | ........................ | 285/242 |
| 4,585,035 A | * | 4/1986 | Piccoli | ........................ | 138/127 |

* cited by examiner

*Primary Examiner*—Harold Pyon
*Assistant Examiner*—Marc Patterson
(74) *Attorney, Agent, or Firm*—Rader, Fishman & Grauer PLLC

(57) ABSTRACT

A high pressure rubber hose has a plurality of reinforced layers. Each reinforced layer is buried by way of an intermediate rubber layer between an inner rubber layer and an outer rubber layer, in which an organic fiber reinforced layer braided from organic fiber cords into two spiral layers or one braided layer is disposed to the inner rubber layer on the outer circumference thereof. A steel wire reinforced layer braided from steel wires into two spiral layers is disposed to the organic fiber reinforced layer at the outer circumference thereof. The braiding angle of the organic fiber reinforced layer is less than braiding angle of the steel wire reinforced layer and the braiding tension of the organic fiber reinforced layer is higher than the braiding tension of the steel wire reinforced layer.

15 Claims, 2 Drawing Sheets

HIGH PRESSURE RUBBER HOSE AND MANUFACTURING METHOD THEREOF

TECHNICAL FIELD

This invention concerns a high pressure rubber hose and a manufacturing method thereof and, more specifically, it relates to a high pressure rubber hose intended for the improvement of flexibility and the reduction of weight by using organic fibers and steel wires together as a reinforcing material while preventing breakage of organic fibers caused by buckling, as well as a manufacturing method thereof.

BACKGROUND ART

High pressure rubber hoses include those having plural reinforced layers each buried by way of an intermediate rubber layer between an inner rubber layer and an outer rubber layer and spirally braiding steel wires as a reinforced layer. However, the steel wire reinforced layer involves drawbacks of poor flexibility and remarkable increase in the weight of the hose. Then, for the improvement of the flexibility and the reduction of the weight, it has been attempted to replace a portion of the reinforced layer with organic fibers such as aromatic polyamide fibers.

However, since the organic fibers of high modulus of elasticity used for reinforcement such as aromatic polyamide fibers are tended to be broken by buckling, they have a problem of poor durability as the reinforcing material for the high pressure rubber hose. Therefore, it has been generally considered difficult to obtain a high pressure rubber hose reduced in the weight and excellent in the flexibility by the combined use of the organic fiber material and the steel wire material.

This invention intends to provide a high pressure rubber hose for the improvement of the flexibility and the reduction of the weight by combined use of organic fibers and steel wires as a reinforcing material, and for the improvement of the durability by preventing breakage of organic fibers caused by buckling, as well as a manufacturing method thereof.

DISCLOSURE OF THE INVENTION

A high pressure rubber hose according to this invention for attaining the foregoing object resides in a high pressure rubber hose having plural reinforced layers each buried by way of an intermediate between an inner rubber layer and an outer rubber layer, in which an organic fiber reinforced layer braided from organic fiber cords into two spiral layers or one braid-like layer is disposed to the inner rubber layer on the outer circumference thereof, a steel wire reinforced layer braided from steel wires into two spiral layers is disposed to the organic fiber reinforced layer at the outer circumference thereof, wherein the braiding angle of the organic fiber reinforced layer is less than the braiding angle of the steel wire reinforced layer and the braiding tension of the organic fiber reinforced layer is higher than the braiding tension of the steel wire reinforced layer.

In a case of using the organic fibers and the steel wires in combination as the reinforcing material for the high pressure rubber hose for improving the flexibility and reducing the weight as described above, since the braiding angle of the organic fiber reinforced layer is less than the braiding angle of the steel wire reinforced layer and the braiding tension of the organic fiber reinforced layer is higher than the braiding tension of the steel wire reinforced layer, stress of the organic fiber reinforced layer undergoing from the steel wire reinforced layer (strain) is decreased to suppress buckling, so that breakage of the organic fibers by buckling can be prevented to improve the durability.

Meanwhile, a method of manufacturing a high pressure rubber hose according to this invention comprises molding an unvulcanized inner rubber layer on the outer circumference of an elongate flexible mandrel, forming an organic fiber reinforced layer braided from organic fiber cords into two spiral layers or one braid-like layer to the outer circumference thereof, forming a steel wire reinforced layer braided from steel wires into two spiral layers on the outer circumference thereof by way of an unvulcanized intermediate layer, laminating an unvulcanized outer rubber layer on the outer circumference thereof and then taking up the flexible mandrel around a drum and applying vulcanization.

According to the manufacturing method described above, a high pressure rubber hose having the organic fiber reinforced layer and the steel wire reinforced layer can be formed to a length of 40 m or more.

BEST MODE FOR PRACTICING THE INVENTION

Figure 1:
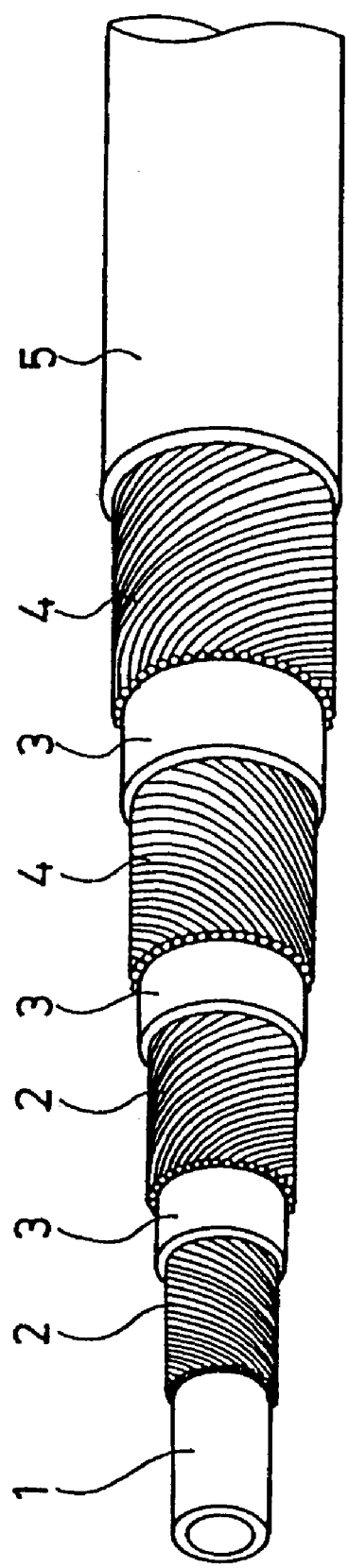
FIG. 1 is a partially cut-way perspective view of a high pressure rubber hose according to a preferred embodiment of this invention.

In FIG. 1, a high pressure rubber hose has a laminate structure in which organic fiber reinforced layers 2 of a two-layered structure and steel wire reinforced layers 4 of a two layered structure are buried between an innermost inner rubber layer 1 and an outermost outer rubber layer 5, successively from the inside and an intermediate rubber layer 3 is interposed between each of the layers.

There are no particular restrictions on the rubber material for the inner rubber layer 1, the intermediate rubber layer 3 and the outer rubber layer 5 and, for example, nitrile-butadiene rubber (NBR) can be used for the inner rubber layer 1 and the intermediate rubber layer 3, and chloroprene rubber (CR) can be used for the outer rubber layer 5.

Figure 2:
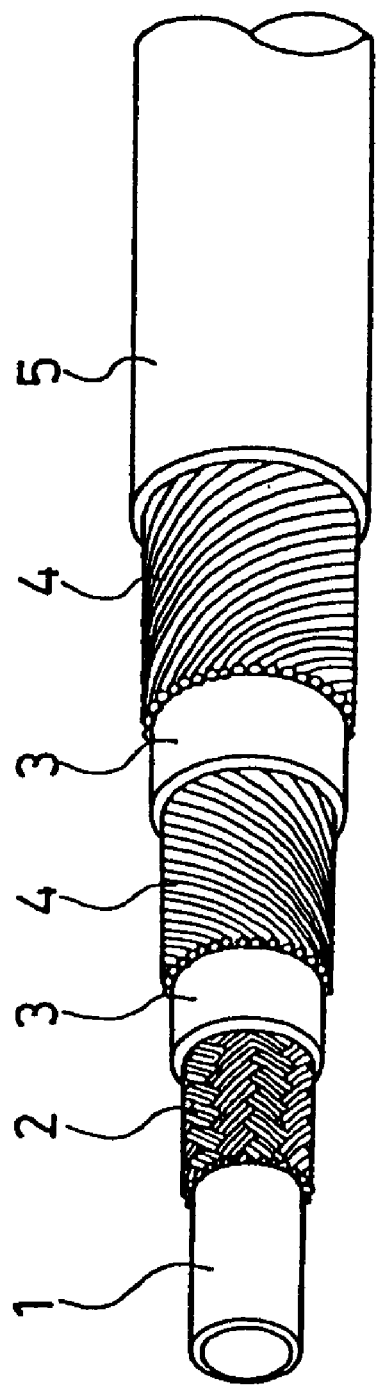
FIG. 2 is a partially cut-way perspective view of a high pressure rubber hose according to another preferred embodiment of this invention.

The organic fiber reinforced layer 2 has a two-layered structure formed by spirally braiding plural organic fiber cords of high modulus of elasticity while being inclined relative to the axial direction of the hose, the organic fiber cords intersecting to each other between the layers. However, the organic fiber reinforced layer 2 may be braided into one braid-like layer from plural organic fiber cords as shown in FIG. 2. The organic fiber cord used herein has a strength of 15 gf/d (≅16.3 mN/Tex) or more, and an elongation at break of 3% or more and, more preferably, from 4% to 4.8%. The organic fiber having such high strength and high modulus of elasticity can include, for example, aromatic polyamide fibers (aramid fibers). The aromatic polyamide fibers having the physical property described above has a suitable high modulus of elasticity as the reinforcing material for the high pressure hose. Further, the organic fiber cord is applied with an adhesion treatment by latex or the like to increase the adhesion strength to the rubber to 1.6 kN/m or more.

On the other hand, the steel wire reinforced layer 4 has a two layered structure formed by spirally braiding plural steel wires while inclining them relative to the axial direction of the hose, in which steel wires intersect to each other between the layers. Steel wires having a diameter of 0.30 mm to 0.80 mm can be used.

In the high pressure rubber hose described above, the braiding angle of the organic fiber reinforced layer 2 is made smaller than the braiding angle of the steel wire reinforced layer 4. By making the braiding angle of the organic fiber reinforced layer 2 less than the braiding angle of the steel wire reinforced layer 4, the stress exerting on the organic fiber reinforced layer 2 exerting from the steel wire reinforced layer 4 can be reduced. The term "braiding angle" means an angle of intersection between organic fiber cords or steel wires crossing to each other with respect to the axial direction of the hose.

Further, the braiding tension of the organic fiber reinforced layer 2 is made higher than the braiding tension of the steel wire reinforced layer 4. By setting the braiding tension of the organic fiber reinforced layer 2 higher than the braiding tension of the steel wire reinforced layer 4, the stress that the organic fiber reinforced layer 2 undergoes from the steel wire reinforced layer 4 can be reduced. The braiding tension of the organic fiber reinforced layer 2 is desirably made within a range from 120% to 180%, more preferably, 150% to 180% of the braiding tension of steel reinforced layer 4. If the ratio is less than 120%, the effect of reducing the stress of the organic fiber reinforced layer 2 becomes insufficient. On the other hand, if it exceeds 180%, the initial strain is excessive and the balance of tension is lost to deteriorate the durability.

In this invention, since the buckling of the organic fiber reinforced layer 2 can be suppressed effectively by setting the relation described above for the braiding angle and the braiding tension of the organic fiber reinforced layer 2 and the steel reinforced layer 4, breakage caused by the buckling of the organic fibers can be prevented to improve the durability of the high pressure rubber hose. Accordingly, in a case of intending to improve the flexibility and reduce the weight by combined use of the organic fibers and the steel wires as the reinforcing material, a high pressure rubber hose having excellent durability comparable with that of steel wire reinforcement can be provided. As a result, it is possible to decrease the radius of bending for the high pressure rubber hose by more than 10% compared with that obtained by existent steel wire reinforcement.

Then, a method of manufacturing a high pressure rubber hose according to this invention is to be explained. When a high pressure rubber hose is manufactured, an unvulcanized inner rubber layer 1 is molded on the outer circumference of a mandrel, and an organic fiber reinforced layer 2 braided from organic fiber cords into two spiral layers or one braided layer are formed on the outer circumference of the mandrel. Then, a steel reinforced layer 4 braided from steel wires into two spiral layers is formed by way of an unvulcanized rubber layer 3 to the outer circumference of the organic fiber reinforced layer 2 and an unvulcanized outer rubber layer 5 is further laminated on the outer circumference thereof.

In the braiding step described above, the braiding angle of the organic fiber reinforced layer 2 is made less than the braiding angle of the steel reinforced layer 4, while the braiding tension of the organic fiber reinforced layer 2 is made higher than the braiding tension of the steel wire reinforced layer 4. By controlling the braiding angle and the braiding tension, breakage caused by buckling of the organic fibers is prevented to improve the durability of the high pressure rubber hose. Subsequently, the unvulcanized rubber hose is heated together with mandrel to apply vulcanization.

Since the length of the high pressure rubber hose is restricted by the length of the mandrel, it was difficult to manufacture a high pressure rubber hose of a length of 40 m or more. Then, a flexible mandrel is used for the core member and unvulcanized rubber hose is molded to the periphery of the flexible mandrel, which is then taken up around a drum and vulcanized. By using the flexible mandrel and applying vulcanization in a state of taking up the unvulcanized rubber hose together with the flexible mandrel around the drum, a high pressure rubber hose having the organic fiber reinforced layer 2 and the steel reinforced layer 4 can be formed to a long size of 40 m or more.

In the manufacturing method described above, when the organic fiber reinforced layer 2 is applied on the inner rubber layer 1, the braiding density is made 100% or more so as not to form a gap at each of crossing points of the organic fibers constituting the organic fiber reinforced layer 2. Since the gaps are not present in the organic fiber reinforced layer 2, unvulcanized rubber of the inner rubber layer 1 can be prevented from blowing through the organic fiber reinforced layer 2 to the outer circumference during vulcanization under drum winding, so that the quality of the high pressure rubber hose is not deteriorated when drum-wound vulcanization is applied by using the flexible mandrel.

EXAMPLE

High pressure rubber hoses of Examples 1 to 4 and an example of the prior art were manufactured respectively with the inner diameter of 19 mm, the outer diameter of 30 mm, with the hose structures being made different as described below.

Example 1

Two organic fiber reinforced layers braided spirally from aromatic polyamide fiber cords ("TECHNOLA" 1500d/2, manufactured by Teijin Co.) by the number of 74 per one circumference and two steel wire reinforced layers braided spirally from 90 steel wires (steel wire: 0.5 HT) per one circumference were buried each by way of an intermediate rubber layer between the inner surface rubber layer and the outer surface rubber layer (refer to FIG. 1). The organic fiber reinforced layer was formed by once taking up 5 or 6 organic fiber cords under a winding tension of 800 g around a bobbin, and braiding them while unwinding from the bobbin. The braiding tension and the braiding angle of the organic fiber reinforced layer and the steel wire reinforced layer are as shown in Table 1. The aromatic polyamide fiber cords ("TECHNOLA" 1500 d/2) had physical property with a strength of 15 gf/d and an elongation at breaking of 4.4% and an adhesion strength to the rubber was controlled by latex adhesion to 1.6 kN/m.

Example 2

Procedures were identical with those in Example 1 except for making the braiding angle of the organic fiber reinforced layer smaller.

Example 3

Procedures were identical with those in Example 1 except for setting the winding tension of the organic fiber reinforced layer to 200–350 g thereby lowering the braiding tension.

Example 4

One organic fiber reinforced layer braided into a braid-like layer from aromatic polyamide fiber cords ("TECHNOLA" 1500d/2, manufactured by Teijin Co.) by the number of 144 (six in one bundle) per one circumference and two steel reinforced layers braided spirally from 90 steel wires (steel wire: 0.5 HT) per circumference were buried each by way of an intermediate rubber layer between the inner surface rubber layer and the outer surface rubber layer (refer to FIG. 2). The organic fiber reinforced layer was formed by once taking up 6 organic fiber cords under a winding tension of 800 g on around a bobbin and braiding them while unwinding from the bobbin. The braiding tension and the braiding angle of the organic fiber reinforced layer and the steel wire reinforced layer are as shown in Table 1. The aromatic polyamide fiber cord ("TECHNOLA" 1500 d/2) had physical property with a strength of 15 gf/d and an elongation at breaking of 4.4%, and an adhesion strength rubber was controlled by a latex adhesion treatment to 1.6 kN/m.

Example of Prior Art

Four steel wire reinforced layers each braided spirally from 86 steel wires (steel wire: 0.5 HT) per one circumference were buried each by way of an intermediate rubber layer between an inner surface rubber layer and an outer surface rubber layer. The braiding tension and the braiding angle of the steel wire reinforced layer are as shown in Table 1.

For the high pressure rubber hoses of Examples 1 to 4 and the example of the prior art, weight of hose, pressure at break, high temperature impact performance and bending reaction were measured by the following measuring methods and the results are also shown together in Table 1.

Hose Weight:

Specimen hoses were cut each into an identical length and the weight (g) was measured.

Pressure at Break:

An oil pressure in a test specimen hose was increased to measure a pressure leading to destruction (MPa).

High Temperature Impact Performance

A test specimen hose was maintained in a U-shaped configuration with a bending radius of 200 mm, and trapezoidal impulses were added repeatedly under the conditions at an inner pressure of 33.6 MPa and an oil temperature of 100° C. and the cycles leading to breakage was measured. The test was terminated for the specimens not leading to breakage even applying impact pressure up to 400,000 cycles.

Bending Reaction:

A test specimen hose was bent and one end was urged to the other end, and the bending reaction (N) at the bending radius of 200 mm was measured. As the bending reaction (N) is smaller, the flexibility is more excellent.

TABLE 1

|  | Example 1 | Example 2 | Example 3 | Example 4 | Prior art example |
|---|---|---|---|---|---|
| Braiding tension (lb.) |  |  |  |  |  |
| Organic fiber reinforced layer | 15 | 15 | 12 | 18 | — |
| Steel wire reinforced layer | 10 | 10 | 10 | 10 | 12, 10 |
| Braiding angle (°) |  |  |  |  |  |
| Organic fiber reinforced layer | 109.0 | 104.0 | 109.0 | 105.0 | — |
| Steel wire reinforced layer | 110.0 | 110.0 | 110.0 | 110.0 | 104, 110 |
| Hose weight (g) | 1060 | 1060 | 1060 | 960 | 1380 |
| Pressure at break (MPa) | 178.0 | 178.0 | 178.0 | 175.0 | 215.0 |
| High temperature impact performance (impulse number of times) | 320,000~400,000 | 400,000 | 100,000~300,000 | 400,000 | 400,000 |
| Bending reaction (N) | 45.1 | 45.1 | 45.1 | 39.2 | 56.0 |

As apparent from Table 1, the high pressure rubber hoses of Examples 1 to 4 were reduced in the weight and excellent in the flexibility and also favorable in the high temperature impact performance compared with the high pressure rubber hose of the example of the prior art applied with steel wire reinforcement.

As has been described above, according to the high pressure rubber hose of this invention, it is possible to improve the flexibility and reduce the weight by combined use of the organic fibers and the steel wires as the reinforcing material, and prevent breakage caused by buckling of the organic fibers to improve the durability. Further, according to the manufacturing method of the high pressure rubber hose of this invention, a high pressure rubber hose having the organic fiber reinforced layers and the steel wire reinforced layers can be formed to a long size of 40 m or more.

INDUSTRIAL APPLICABILITY

This invention having the foregoing excellent effects can be utilized effectively as a high pressure rubber hose constituting a hydraulic device, a hydraulic circuit or the like, and also as a manufacturing method thereof.

What is claimed is:

1. A high-pressure rubber hose extending along a central axis, comprising:
   an inner rubber layer having a rubber layer outer surface;
   an organic fiber reinforced layer having an organic fiber outer surface and fabricated solely from organic fiber cords into two spiral layers or one braided layer disposed to the inner rubber layer on the rubber layer outer surface;
   a first intermediate rubber layer having a first intermediate outer surface disposed to the organic fiber reinforced layer on the organic fiber outer surface;

a first steel wire reinforced layer having a first steel wire outer surface and fabricated solely from steel wires in a form of a spiral layer disposed to the first intermediate layer on the first intermediate outer surface;

a second intermediate rubber layer having a second intermediate outer surface and disposed to the first steel wire reinforced layer on the first steel wire outer surface;

a second steel wire reinforced layer having a second steel wire outer surface and fabricated solely from steel wires in a form of a spiral layer disposed to the second intermediate rubber layer on the second intermediate outer surface; and an outer rubber layer disposed to the second steel wire reinforced layer on the second steel wire outer surface, wherein the organic fiber cords cross each other at a first angle relative to the central axis and the steel wires cross each other at a second angle relative to the central axis with the first angle being less than the second angle and the organic fiber cords being wound around the inner rubber layer at a first tension, the first and second steel wires being wound around respective ones of the first and second intermediate rubber layers at a second tension with the first tension being greater than the second tension.

2. A high-pressure rubber hose as defined in claim 1, wherein the first tension of the organic fiber cords is made within a range from 120% to 180% of the second tension of the steel wires.

3. A high pressure rubber hose as defined in claim 1, wherein the organic fiber cord has physical property with a strength of 15 grams per denier or more and an elongation at break of 3% or more, and has an adhesion to rubber of 1.6 kilonewtons per meter or more.

4. A high-pressure rubber hose as defined in any one of claims 1 to 3, wherein the organic fiber cord comprises an aromatic polyamide.

5. A high-pressure rubber hose extending along a central axis, comprising:

an inner rubber layer having a rubber layer outer surface;

a first organic fiber reinforced layer having a first organic fiber outer surface and fabricated solely from organic fiber cords and formed into a spiral layer disposed to the inner rubber layer on the rubber layer outer surface;

a first intermediate rubber layer having a first intermediate outer surface and disposed to the first organic fiber reinforced layer on the first organic fiber outer surface;

a second organic fiber reinforced layer having a second organic fiber outer surface and fabricated solely from organic fiber cords and formed into a spiral layer disposed to the first intermediate inner rubber layer on the first intermediate outer surface;

a second intermediate rubber layer having a second intermediate outer surface and disposed to the second organic fiber reinforced layer on the second organic fiber outer surface;

a first steel wire reinforced layer having a first steel wire outer surface and fabricated solely from steel wires and formed into a spiral layer disposed to the second intermediate rubber layer on the second intermediate outer surface;

a third intermediate rubber layer having a third intermediate outer surface and disposed to the first steel wire reinforced layer on the first steel wire outer surface;

a second steel wire reinforced layer having a second steel wire outer surface and fabricated solely from steel wires and formed into a spiral layer disposed to the third intermediate rubber layer on the third intermediate outer surface; and an outer rubber layer disposed to the second steel wire reinforced layer on the second steel wire outer surface, wherein respective ones of the first and second organic fiber cords cross each other at a first angle relative to the central axis and respective ones of the first and second steel wires cross each other at a second angle relative to the central axis with the first angle being less than the second angle and respective ones of the first and second organic fiber cords being wound around respective ones of the inner rubber layer and the first intermediate rubber layer at a first tension, the first and second steel wires being wound around respective ones of the second and third intermediate rubber layers at a second tension with the first tension being greater than the second tension.

6. A high pressure rubber hose as defined in claim 5, wherein the tension of the organic fiber cords is made within a range from 120% to 180% of the tension of the steel wires.

7. A high pressure rubber hose as defined in claim 5, wherein the organic fiber cord has physical property with a strength of 15 grams per denier or more and an elongation at break of 3% or more, and has an adhesion to rubber of 1.6 kilonewtons per meter or more.

8. A high pressure rubber hose as defined in any one of claims 5, 6 and 7, wherein each organic fiber cord comprises an aromatic polyamide.

9. A high-pressure rubber hose extending along a central axis, comprising:

an inner rubber layer having a rubber layer outer surface;

an organic fiber reinforced layer having an organic fiber outer surface and fabricated solely from organic fiber cords and formed into an interwoven, braided layer disposed to the inner rubber layer on the rubber layer outer surface;

a first intermediate rubber layer having a first intermediate outer surface and disposed to the organic fiber reinforced layer on the rubber layer outer surface;

a first steel wire reinforced layer having a first steel wire outer surface and fabricated solely from steel wires and formed into a spiral layer disposed to the first intermediate layer on the first intermediate outer surface;

a second intermediate rubber layer having a second intermediate outer surface disposed to the first steel wire reinforced layer on the first steel wire outer surface;

a second steel wire reinforced layer having a second steel wire outer surface and fabricated solely from steel wires and formed into a spiral layer disposed to the second intermediate rubber layer on the second intermediate outer surface; and an outer rubber layer disposed to the second steel wire reinforced layer on the second steel wire outer surface;

wherein the organic fiber cords cross each other at a first angle relative to the central axis and respective ones of the first and second steel wires cross each other at a second angle relative to the central axis with the first angle being less than the second angle and the organic fiber cords being wound around the inner rubber layer at a first tension, the first and second steel wires being wound around respective ones of the first and second intermediate rubber layers at a second tension with the first tension being greater than the second tension.

10. A high pressure rubber hose as defined in claim 9, wherein the tension of the organic fiber cords is made within a range from 120% to 180% of the tension of the steel wires.

11. A high pressure rubber hose as defined in claim 9, wherein the organic fiber cord has physical property with a strength of 15 grams per denier or more and an elongation at break of 3% or more, and has an adhesion to rubber of 1.6 kilonewtons per meter or more.

12. A high pressure rubber hose as defined in any one of claims 9, 10 and 11, wherein each organic fiber cord comprises an aromatic polyamide.

13. A high pressure rubber hose as defined in claim 1, wherein the organic fiber reinforced layer has a braiding density of at least 100%.

14. A high pressure rubber hose as defined in claim 5, wherein each one of the first and second organic fiber reinforced layers has a braiding density of at least 100%.

15. A high pressure rubber hose as defined in claim 9, wherein the organic fiber reinforced layer has a braiding density of at least 100%.

* * * * *